June 30, 1931.  R. LEITZKE  1,812,657

ATTACHABLE WASHER

Filed Dec. 21, 1929

Inventor
Reinhard Leitzke
By
Attorneys

Patented June 30, 1931

1,812,657

UNITED STATES PATENT OFFICE

REINHARD LEITZKE, OF BEAVER DAM, WISCONSIN

ATTACHABLE WASHER

Application filed December 21, 1929. Serial No. 415,760.

This invention relates to an attachable washer for taking up end thrust on shafts.

One of the objects of my invention is the provision of a washer which can be quickly and easily applied to a shaft adjacent a bearing, pulley, gear or the like, for taking up the end thrust of a shaft whereby to reduce to a minimum the longitudinal movement of a shaft where the bearings have become worn, or where any parts attached to the shaft have become so worn as to allow longitudinal movement on the part of the shaft.

Another object of my invention is the provision of a device of the above character which is normally in an opened position so that it can be fitted to the shaft between two closely adjacent members and readily clamped onto the shaft to provide a washer for spacing two adjacent parts so as to eliminate end thrust on the part of the shaft.

A further object of the invention is the provision of a normally split attachable washer which is provided with a substantially reduced portion providing a suitable hinge whereby the ends which are normally spaced apart, of the washer, can be quickly moved together so that the washer will embrace a shaft and can be readily positioned between two closely adjacent members.

With the above and other objects in view, the invention consists in the novel features of construction, the combination and arrangements of parts hereinafter more fully set forth, pointed out in the claim and shown in the accompanying drawings wherein:

Referring more particularly to the drawings, 1 indicates a shaft, supported in a bearing 2 and having a gear 3 mounted upon the shaft with the thrust bearing sleeve 4.

As a general rule, a rotative member upon a shaft adjacent a bearing or any contact with another member has a tendency to wear off and permit end thrust of the shaft. In a great many instances, it is rather difficult to eliminate or take up this end thrust and as a general rule, it is a rather expensive operation where it is necessary to remove a number of parts in order to apply a washer to the shaft to take up this end thrust.

It is, therefore, one of the principal objects of my invention to provide a washer which can be quickly and readily applied to the shaft between two adjacent members without removing any of the parts and thus take up the end thrust of the shaft at a very small expense.

Figure 1:
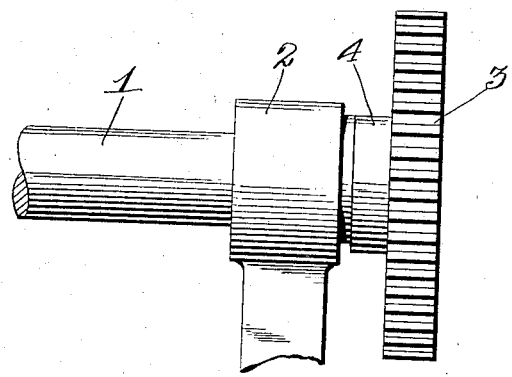
Figure 1 is a side elevation of a portion of a shaft with a gear thereon adjacent the shaft bearing to illustrate the application of my invention.
Figure 2:
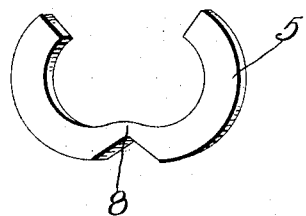
Figure 2 is a perspective view of the washer in its normal unapplied position; and, Figure 3 illustrates in side elevation the relative position of the washer after being applied to the shaft, the washer being illustrated in normal position in dotted lines.
Figure 3:
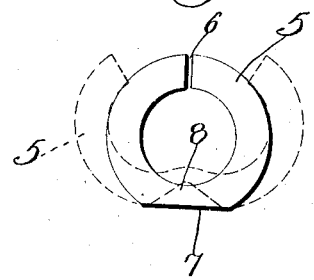

In Figure 2, I have illustrated a perspective of my improved washer which is formed of a single piece. As illustrated in Figure 3, the washer is stamped out or otherwise formed of a single piece of material substantially circular upon the interior, in order to be fitted to a shaft. The body of the washer 5 is split as shown at 6, at one side of the washer, at a substantially diametric point, the washer is cut off at its outer edge to form a substantially straight outer portion 7, leaving a somewhat reduced portion 8 at this point of the washer.

After the washer has been properly formed, it is put through a heating process in order to temper and strengthen the reduced portion 8 so that the washer can be bent to the position shown in Figure 2, with the reduced portion 8 forming a substantial hinge for the side parts of the washer.

From this, it will be apparent that the washers are placed upon the market in the position shown in Figure 2, with the ends of the washer spaced apart, so that the device can be quickly applied to a shaft and when properly positioned the ends can be moved toward each other, to securely clamp the washer on the shaft in the position shown in Figure 3.

It will be apparent from the foregoing that I have provided a very simple and inexpensive device which can be quickly and readily applied to shafts for the purpose of taking up any loose end thrusts of the shaft in its bearings.

Attention is directed to the fact that in forming the washer for use, the cut away portion at one side of the washer may be of any substantial design as long as the washer is so shaped as to provide a comparatively weak portion at this point to form a hinge for the oppositely curved parts of the washer. It will be noted that after the washer has been cut away at the side opposite the slit, it will provide a reduced portion whereby the opposed parts of the washer at opposite sides of the slit each form a substantial arc, so that when the two parts are bent together around the shaft, they will describe a circle.

While I have shown and described the preferred embodiment of my invention, it will be apparent that slight changes may be made in the construction when putting the invention into practice without departing from the spirit of the same or the scope of the appended claim.

I claim:

A washer with a substantially circular circumference having a radial slit, the circular circumference being cut away at right angles and directly opposite the slit on a chord between the inner and outer peripheries and intersecting the outer periphery only to remove a segmental portion of the washer providing a reduced hinged connection for the opposite sides of the washer.

In testimony that I claim the foregoing I have hereunto set my hand at Beaver Dam, in the county of Dodge and State of Wisconsin.

REINHARD LEITZKE.